(12) United States Patent
Gardenour

(10) Patent No.: US 6,874,797 B2
(45) Date of Patent: Apr. 5, 2005

(54) COLLAPSIBLE REFUSE COLLECTION APPARATUS

(76) Inventor: Larry Gardenour, 21 Loop Rd., Merrimack, NH (US) 03054

( * ) Notice: Subject to any disclaimer, the term of this patent is extended or adjusted under 35 U.S.C. 154(b) by 83 days.

(21) Appl. No.: 10/360,138

(22) Filed: Feb. 7, 2003

(65) Prior Publication Data

US 2004/0155419 A1 Aug. 12, 2004

(51) Int. Cl.$^7$ ................................................. B62B 7/02
(52) U.S. Cl. ..................... 280/47.131; 220/9.2; 220/908
(58) Field of Search ........................ 280/47.131, 47.17, 280/47.18, 47.26, 27; 220/9.2, 9.3, 908; 383/12, 104

(56) References Cited

U.S. PATENT DOCUMENTS

| | | | | | |
|---|---|---|---|---|---|
| 2,115,308 | A | * | 4/1938 | Koch | 220/6 |
| 2,778,560 | A | * | 1/1957 | Pfeiffer | 220/9.2 |
| 3,583,748 | A | * | 6/1971 | Arndt | 294/68.24 |
| 3,754,771 | A | * | 8/1973 | Shagoury | 280/654 |
| 3,773,286 | A | * | 11/1973 | Govoni et al. | 248/97 |
| 4,140,257 | A | * | 2/1979 | Peterson | 294/151 |
| 4,357,728 | A | * | 11/1982 | Pravettone | 15/257.4 |
| 4,596,397 | A | * | 6/1986 | Conti | 280/47.131 |
| 4,917,393 | A | * | 4/1990 | Rogers | 280/47.28 |
| 4,951,831 | A | * | 8/1990 | Roesch et al. | 220/676 |
| 5,048,778 | A | * | 9/1991 | Wright | 248/98 |
| 5,476,184 | A | * | 12/1995 | Hill | 220/9.2 |
| 5,544,781 | A | * | 8/1996 | Mattesky | 220/9.4 |
| 5,800,067 | A | * | 9/1998 | Easter | 383/104 |
| 5,964,533 | A | * | 10/1999 | Ziglar | 383/36 |
| 5,971,188 | A | * | 10/1999 | Kellogg et al. | 220/9.2 |
| 6,044,877 | A | * | 4/2000 | Bennet | 141/390 |
| 6,082,574 | A | * | 7/2000 | Johnson | 220/495.1 |
| 6,126,183 | A | * | 10/2000 | Lensing | 280/47.29 |
| 6,220,998 | B1 | * | 4/2001 | Kellogg et al. | 493/218 |
| 6,276,828 | B1 | * | 8/2001 | Otley et al. | 383/4 |
| 6,360,761 | B1 | * | 3/2002 | Zheng | 135/126 |
| 6,494,335 | B1 | * | 12/2002 | Kellogg et al. | 220/9.3 |
| 6,592,133 | B2 | * | 7/2003 | Powell | 280/79.11 |
| 6,705,338 | B2 | * | 3/2004 | Zheng | 135/126 |
| 2003/0106895 | A1 | * | 6/2003 | Kalal | 220/9.2 |

* cited by examiner

Primary Examiner—Christopher P. Ellis
Assistant Examiner—Kelly E Campbell
(74) Attorney, Agent, or Firm—William B. Ritchie

(57) ABSTRACT

A collapsible refuse collection apparatus. The invention includes a body; the body includes a frame portion and a covering portion having predetermined dimensions. The frame portion has an opened and closed position, two sides and a base; the two sides being adjacently and pivotally attached to the base. The covering portion is surroundedly attached to the frame portion, wherein the covering portion protects the frame portion and, in the frame portion's opened position, forms an inner compartment, a top, an opened end and a closed end. The apparatus also includes a wheel assembly attached to the frame portion providing mobility for the apparatus, a flap pivotally attached to the opened end of the covering portion and having predetermined dimensions. The inner compartment, formed by the frame portion's opened position, has predetermined dimensions such that the inner compartment can accommodate a collection bag. The inner compartment and the collection bag are used to collect the refuse. The sides pivot towards each other and fold towards the base, forming the frame portion's closed position.

9 Claims, 8 Drawing Sheets

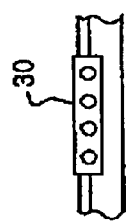
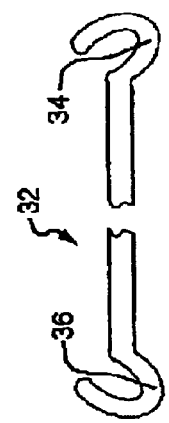
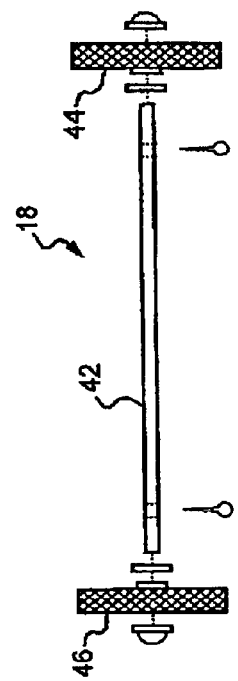
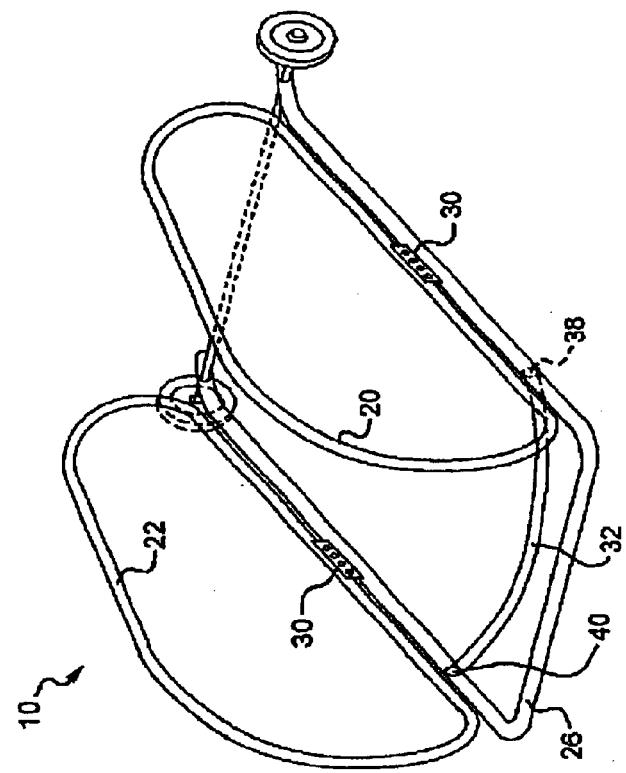

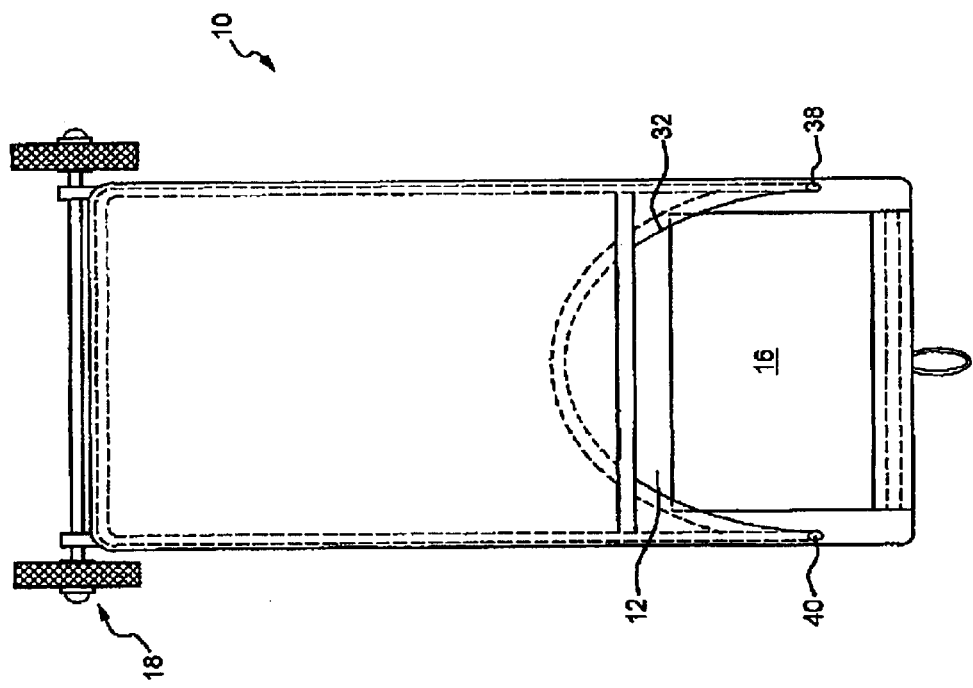

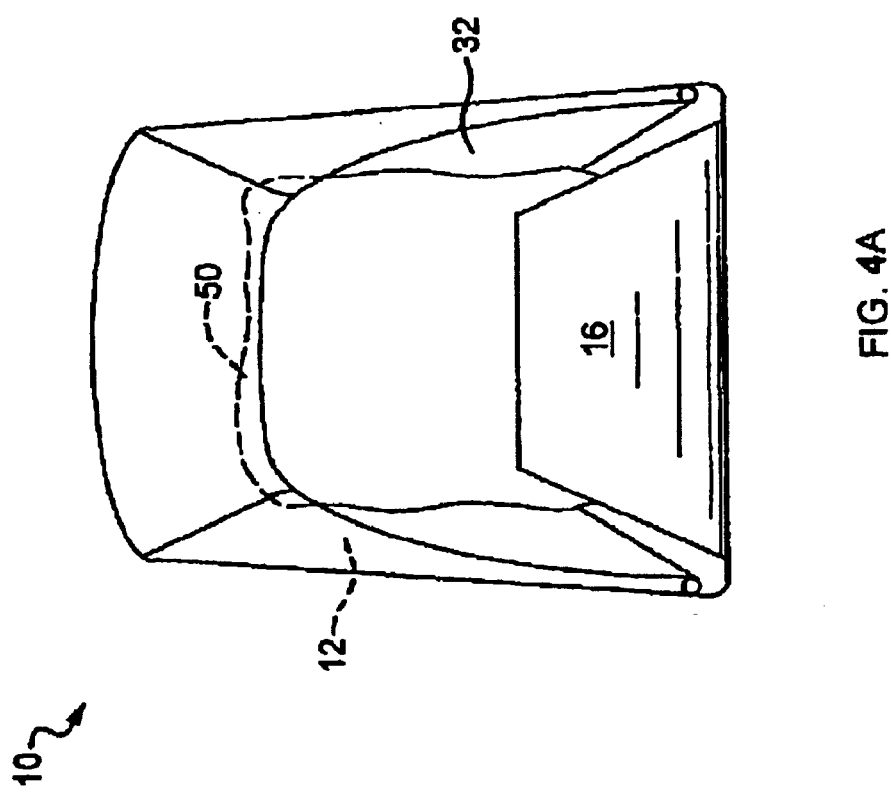

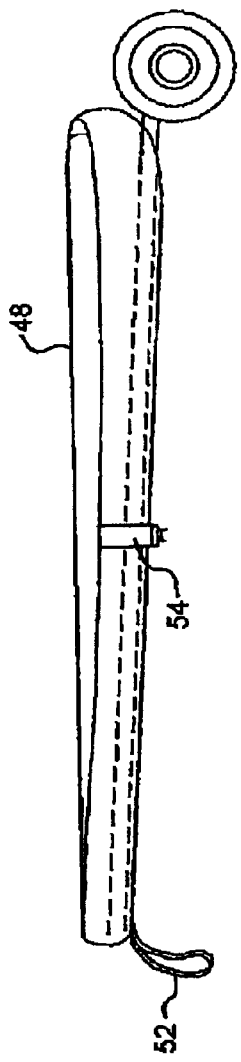
FIG. 7A
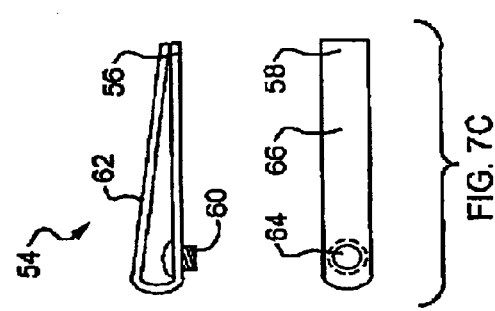
FIG. 7C
FIG. 7B

COLLAPSIBLE REFUSE COLLECTION APPARATUS

FIELD OF THE INVENTION

The present invention relates to the field of refuse collection and, in particular, to a collapsible refuse collection apparatus.

BACKGROUND OF THE INVENTION

Refuse cleanup us an inevitable task, especially during the fall and spring. Although the refuse, such as leaves or brush, can be collected into a pile via raking, leaf blowing and manually collection methods, the actual placing of the refuse into a bag or container and removing it from the collection area is a continual problem. Commercially available leaf bags are flimsy and difficult to fill with refuse, especially by a single person. Trash barrels and other collection containers are limited in size, non-disposable and because of their rigid structure and the shear numbers required, are not conducive to the task of mass refuse removal.

In an attempt to solve this problem, apparatus have been invented in disclosed in many U.S. patents. U.S. Pat. No. 4,452,468 by Eads et al, issued on Jun. 5, 1984 discloses a cart for supporting a flexible plastic having an open mouth through which the interior may be filled with leaves or the like. Although this device serves to aid in the collection of debris, this device has many disadvantages. First, the device only works in conjunction with flexible plastic bags, and therefore, using this device for collecting refuse into paper bags is impossible. And second, the device is non collapsible, therefore, the device is inconvenient to store and transport.

U.S. Pat. No. 4,442,567 by Pravettone, issued on Apr. 17, 1984 discloses a combination dust pan and refuse container constructed of inexpensive lightweight materials which is highly transportable and repositionable from an upright refuse transporting position to a horizontal refuse collecting position. The combination dust pan and container is made up of a framework which distends and substantially encloses a conventional disposable trash bag, four circumferentially spaced ground contacting wheels and a dust pan which depends outwardly from the frame near the mouth of the bag. In the transporting position, all four wheels contact the ground and provide a stable base. Although this device serves to aid in the collection of debris, this device has many disadvantages. First, the device is designed only for use with a plastic trash bag. Therefore, the device cannot be used with paper refuse bags. Second, the device is non collapsible, therefore, the device is inconvenient to store and transport.

U.S. Pat. No. 3,797,847, by Lindsey et al, issued on Mar. 19, 1974, discloses a collapsible and portable cart for trash bags. Although this device is collapsible and portable, this device is designed only for use with plastic trash bags.

U.S. Pat. No. 4,336,951, by Crothers, issued on Jun. 29, 1982 discloses a cart comprising a fabric body and a tubular frame, wheels are located behind the body, and are prevented from coming into contact with the body by protective fenders which also serve as braces for holding the frame elements in rigid relationship to each other. Although this device is collapsible, this device is not designed to be used in conjunction with any refuse bags, and therefore, this device does not solve the problem of placing the actual refuse into a bag for disposal.

U.S. Pat. No. 3,934,803, by Paulus Jr., issued on Jan. 27, 1976, discloses a portable bag distending and supporting apparatus for holding a bag, such as a plastic leaf collector or trash collector, with the receiving end thereof in open position essentially perpendicular to a horizontal surface, thus to permit leaves and trash to be raked or swept into the interior of the bag. Although this device serves to aid in the collection of debris, this device has disadvantages. This device is not designed for use with a paper refuse bag, and does not include wheels for easy transport during collection of refuse.

U.S. Pat. No. 5,449,083 by Dougherty et al., issued on Sep. 12, 1995, discloses a reusable, durable, lawn and garden bagger for the easy collection and transportation of a quantity of loose debris such as leaves and grass clippings, for example. The bagger provides a collapsible container which provides an enlarged opening when secured in the fully open position, and wherethrough loose debris is deposited with a garden tool such as a rake, for example. Although this device serves to aid in the collection of debris, this device has many disadvantages. This device is not designed for use with disposable refuse bags, therefore, the difficulty of loading the refuse into a bag is not overcome using this device. Also, this device does not contain wheels, making it difficult to move while collecting debris.

U.S. Pat. No. 4,697,834 by Scott, issued on Oct. 6, 1987 discloses a lawn debris accumulation and collection apparatus for facilitating the accumulation, collection, and bagging of outdoor debris. Although this device serves to aid in the collection of debris, this device has many disadvantages. First, the device is designed only for use with a plastic trash bag. Therefore, the device cannot be used with paper refuse bags. Therefore, the device will not accommodate a paper refuse bag. Second, the device is not collapsible, therefore, the device is inconvenient to store and transport.

Therefore, there is a need for a refuse collection device that aids in the collection and bagging of refuse, that can be used with paper refuse bags, that is collapsible, and that includes wheels for easy mobility.

SUMMARY OF THE INVENTION

In accordance with one aspect of the present invention, the invention is a collapsible refuse collection apparatus. The invention includes a body; the body includes a frame portion and a covering portion having predetermined dimensions. The frame portion has an opened and closed position, two sides and a base; the two sides being adjacently and pivotally attached to the base. The covering portion is surroundedly attached to the frame portion, wherein the covering portion protects the frame portion and, in the frame portion's opened position, forms an inner compartment, a top, an opened end and a closed end. The apparatus also includes a wheel assembly attached to the frame portion providing mobility for the apparatus, a flap pivotally attached to the opened end of the covering portion and having predetermined dimensions. The inner compartment, formed by the frame portion's opened position, has predetermined dimensions such that the inner compartment can accommodate a collection bag. The inner compartment and the collection bag are used to collect the refuse. The sides pivot towards each other and fold towards the base, forming the frame portion's closed position.

Implementation of this aspect of the present invention may include one or more of the following: a bag support pivotally attached to the base, wherein the bag support has an up position and a down position, the up position provides support for the collection bag; a snap assembly having a top and a bottom part, the top part is attached to one of the two sides and the bottom part is attached to the other of the two sides, wherein the top part and the bottom part mate, forming a connection, when the frame portion is in the closed position; a pull strap attached to the covering; where the covering is water resistant poly coated nylon mesh; and where the frame portion is tubular.

In accordance with another aspect of the invention, the invention is a collapsible refuse collection apparatus which includes a body; the body includes a frame portion and a covering portion having predetermined dimensions. The frame portion has an opened and closed position, two sides and a base; the two sides being adjacently and pivotally attached to the base. The covering portion is surroundedly attached to the frame portion, wherein the covering portion protects the frame portion and, in the frame portion's opened position, forms an inner compartment, a top, an opened end and a closed end. The apparatus also includes a wheel assembly attached to the frame portion providing mobility for the apparatus, a flap pivotally attached to the opened end of the covering portion and having predetermined dimensions. The inner compartment, formed by the frame portion's opened position, has predetermined dimensions such that the inner compartment can accommodate a collection bag. The inner compartment and the collection bag are used to collect the refuse. The apparatus also includes a bag support, which is pivotally attached to the base, wherein the bag support has an up position and a down position, the up position provides support for the collection bag. A snap assembly having a top and a bottom part, is also included in the apparatus, the top part is attached to one of the two sides and the bottom part is attached to the other of the two sides, wherein the top part and the bottom part mate, forming a connection, when the frame portion is in the closed position. The apparatus includes a pull strap attached to the covering. The sides pivot towards each other and fold towards the base, forming the frame portion's closed position.

Implementation of this aspect of the present invention may include one or more of the following: where the frame portion is tubular; and where the covering is water resistant poly coated nylon mesh.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 2 is a front view of the preferred embodiment of the collapsible refuse collection apparatus without the covering showing exploded views of the clip, bag support and wheel assembly.

FIG. 3 is a top view of the preferred embodiment of the collapsible refuse collection apparatus with the covering.

FIG. 4A is a front view of the preferred embodiment of the collapsible refuse collection apparatus, with a collection bag within the body of the refuse collection apparatus, the flap is in the closed position, and the bag support is in the up position.

FIG. 7 is a side view of the preferred embodiment of the collapsible refuse collection apparatus with the covering, in the collapsed position, with exploded views of the pull strap and the snap assembly.

DETAILED DESCRIPTION OF THE INVENTION

The present invention is a collapsible refuse collection apparatus. In the preferred embodiment, the apparatus is formed of a hollow galvanized steel frame covered in a water resistant mesh fabric. One end of the apparatus is opened and has a flap attached. The closed end of the apparatus includes a wheel assembly. The apparatus is designed to accommodate a large collection bag. In the preferred embodiment, the apparatus accommodates a paper bag, and the bag's opened end faces the apparatus's opened end. A flexible steel bag support maintains the paper bag in an open position, and the flap aids in loading the paper bag with refuse by both providing a smooth surface such that one may rake refuse easily into the paper bag and by working to maintain the paper bag in one position. The apparatus is easily collapsible and a snap assembly maintains the collapsed position, while a pull strap, together with the wheel assembly, provides ease in transport and mobility of the apparatus.

Figure 1:
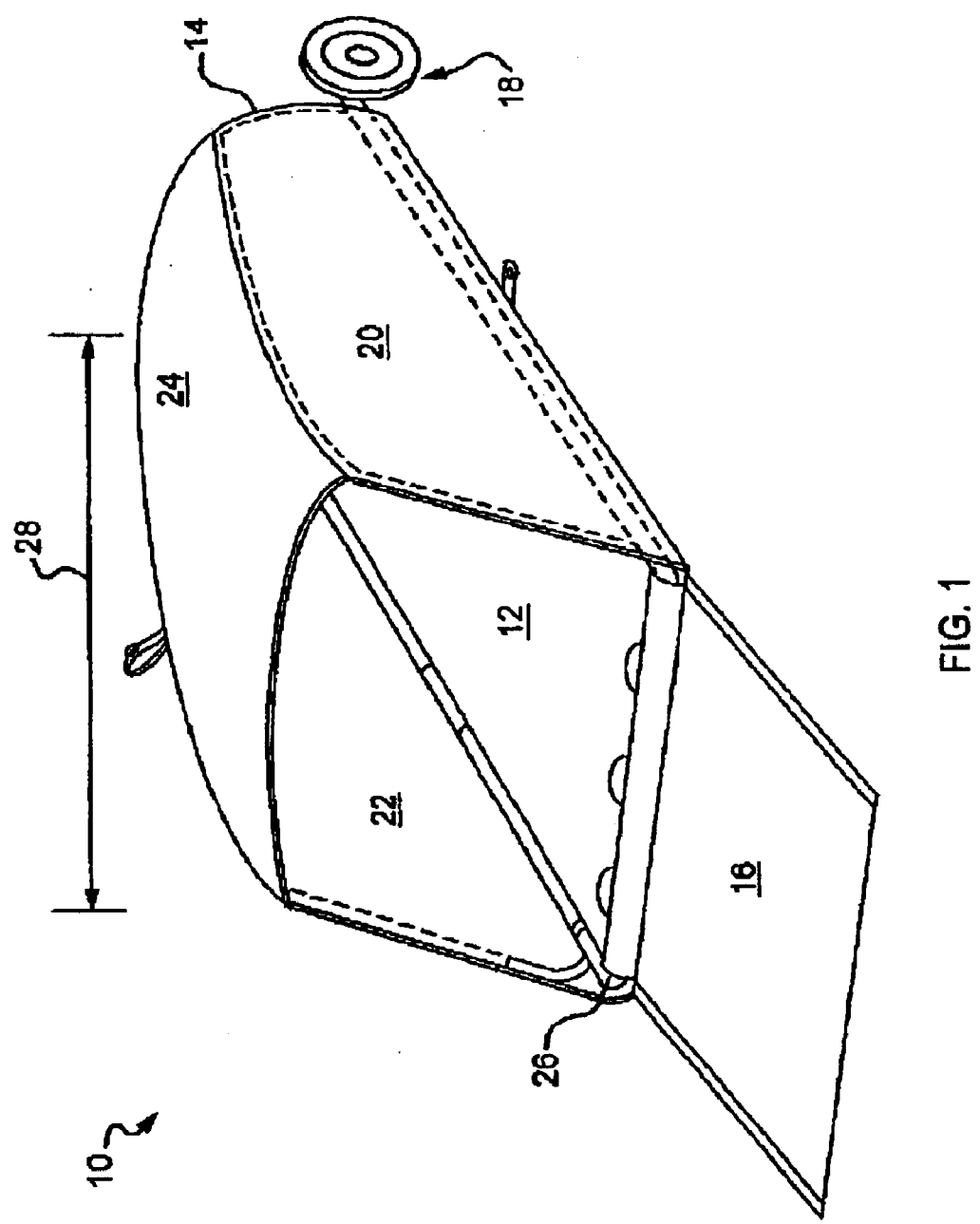
FIG. 1 is a front view of the preferred embodiment of the collapsible refuse collection apparatus in the open position

Referring first to FIG. 1, the preferred embodiment of the invention is shown. The apparatus 10 includes an opened end 12 and a closed end 14. The opened end 12 leads to the inner compartment of the apparatus 10. Attached to the opened end 12 is a flap 16. The flap 16 is capable of folding inward towards the opening 12 of the apparatus 10. The closed end 14 includes a wheel assembly 18. The apparatus 10 includes two sides 20,22, a top 24 and a base 26. In its preferred embodiment, the apparatus 10 is approximately 15 inches high and 43 inches long. The flap 16 is approximately 17 inches long. The apparatus's, dimension 28 is approximately 31 inches. In some alternate embodiments, the apparatus 10 can be any dimension, as long as the apparatus is large enough to accommodate a collection bag. In other embodiments, the apparatus can be used without a collection bag, and the refuse is collected in the inner compartment.

Referring next to FIG. 2, the frame of the apparatus 10 is shown with exploded views. The apparatus 10 frame, in the preferred embodiment, is made of galvanized steel tubing. In the preferred embodiment, the galvanized steel tubing has a diameter of 0.50 inches. However, in other embodiments, the steel tubing has a diameter range of between 0.05 and 0.75 inches Although the tubing is preferably steel, in other embodiments, the tubing is carbon fiber, aluminum, titanium, plastic, copper or any other material known and used in the art. In alternate embodiments, the frame is made from rod rather than tubing.

Still referring to FIG. 2, the sides 20,22 are separate from the base 26. Clip 30 holds the two ends of sides 20,22 together. The clip 30 is shown in an exploded view in FIG. 2. Sides 20,22 work inside the bag loop seam allowing pivotal movement by the sides 20,22 so that they are able to fold towards the base 26. In the preferred embodiment, the clip 30 is used to hold the two ends of 20,22 together. The loop inside the bag works as the hinge. A piece of tubing slipped over the tubing and wire could also be substituted.

The bag support 32, also shown in an exploded view in FIG. 2, in the preferred embodiment, is made from steel wire, and is approximately from 0.062 inches to 0.125 inches in diameter and approximately 24 inches long. The steel wire material is flexible. In other embodiments, the bag support 32 is made from aluminum or plastic and has dimensions approximately 0.25 inches in diameter and again approximately 24 inches long. Regardless of the embodiment, the bag support 32 must be long enough to reach from one side of the base 26 to the other side of the base 26, while forming an arch high enough to accommodate whichever collection bag is used with the invention. As shown in the exploded view, the bag support has a hook 34,36 on each end. The hooks 34,36 hook into support holes 38,40 in the base 26 of the frame of the present invention 10. This arrangement allows the bag support 32 to fold up and down. The bag support 32 is shown in its down position in FIG. 2. The bag support 32 is raised to its up position when a collection bag is placed within the invention (shown in FIG. 4A).

Still referring to FIG. 2, the apparatus 10 includes a wheel assembly 18, shown as an exploded view. The wheel assembly 18 includes a solid continuous axle 42 for two wheels 44,46. In the preferred embodiment, the wheel 44,46 are rubber surface wheels similar to those found on lawn mowers. Molded plastic wheels could also be used. In other embodiments, the wheels are hard plastic wheels, hollow plastic wheels or in-line skating wheels. Also, in alternate embodiments, the wheels 44,46 are individually mounted to the apparatus 10.

Referring now to FIG. 3, a top view of the collapsible refuse bag apparatus 10 is shown. While there is no collection bag located inside the apparatus 10, the bag support 32 is in its down position. The flap 16 is folded inward towards opening 12 of the apparatus 10.

Figure 4:
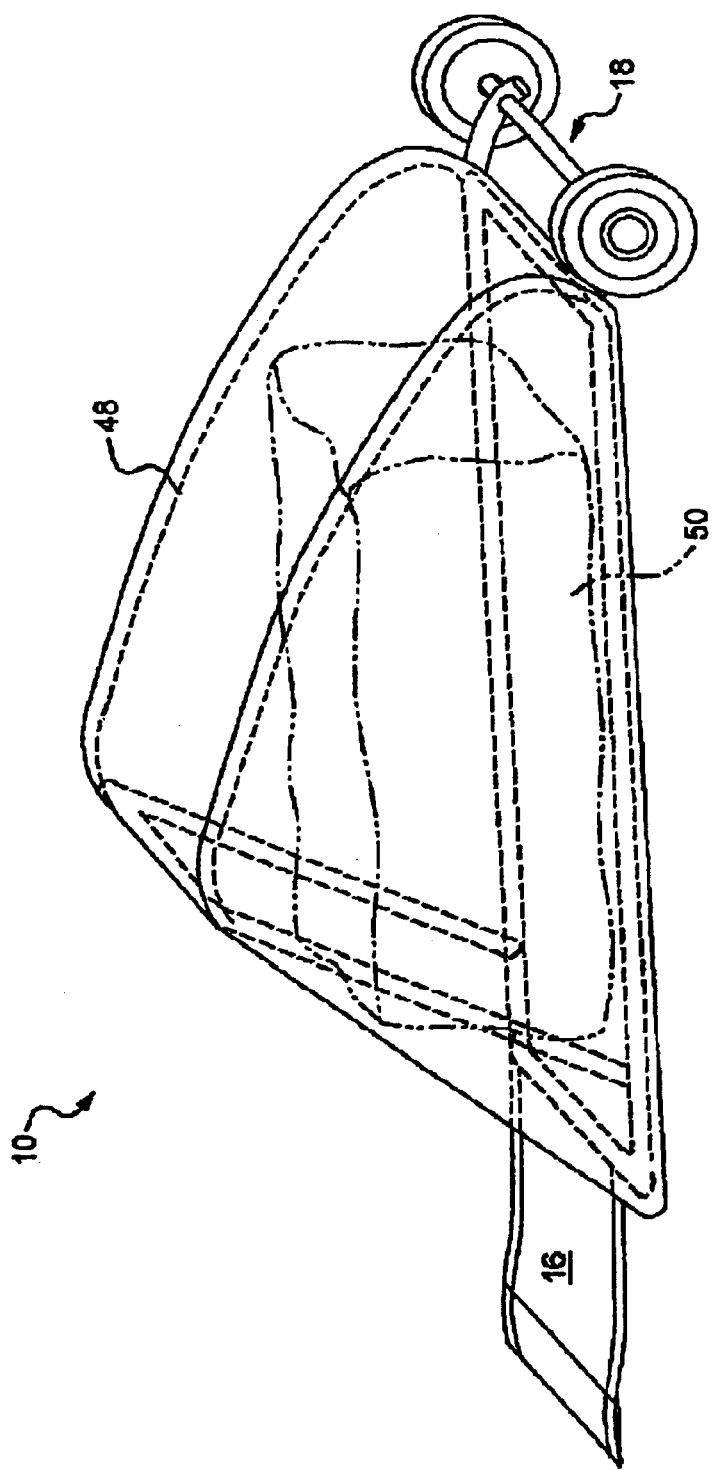
FIG. 4 is a side view of the preferred embodiment of the collapsible refuse collection apparatus with the covering and a collection bag within the body of the refuse collection apparatus; the flap is in the open position.

Referring now to FIG. 4, a side view of the preferred embodiment of the apparatus 10 with the covering 48 and a collection bag 50 within the body of the apparatus 10 is shown. The flap 16 is shown in the open position. In the preferred embodiment, the covering is made from nylon made waterproof through treatment with commonly found chemicals in the art. The covering 48 is water resistant, thereby protecting the inside of the apparatus 10, and the collection bag 50, when used, from the elements. Also, the covering 48 works to protect the frame from rusting or other adverse processes from weather damage. The covering 48 is sewn using sewing practices known and used in the art.

Referring now to FIG. 4A, a front view of the preferred embodiment of the apparatus 10, with a collection bag 50 within the opening 12 of the apparatus 10 is shown. The flap 16 is in the closed position, and is inside the collection bag 50. The bag support 32 is in the up position, and supports the top of the collection bag 50. Also apparent from FIG. 4A, is the additional function of the flap 16. The flap 16 acts to maintain the collection bag's 50 position, while also aiding in the collection of refuse. Refuse is easily raked or manually placed into the collection bag 50 by being raked over the flap 16 and straight into the bag 50. This eliminates problems such as raking the refuse under the bag 50, or under the apparatus 10.

Figure 5:
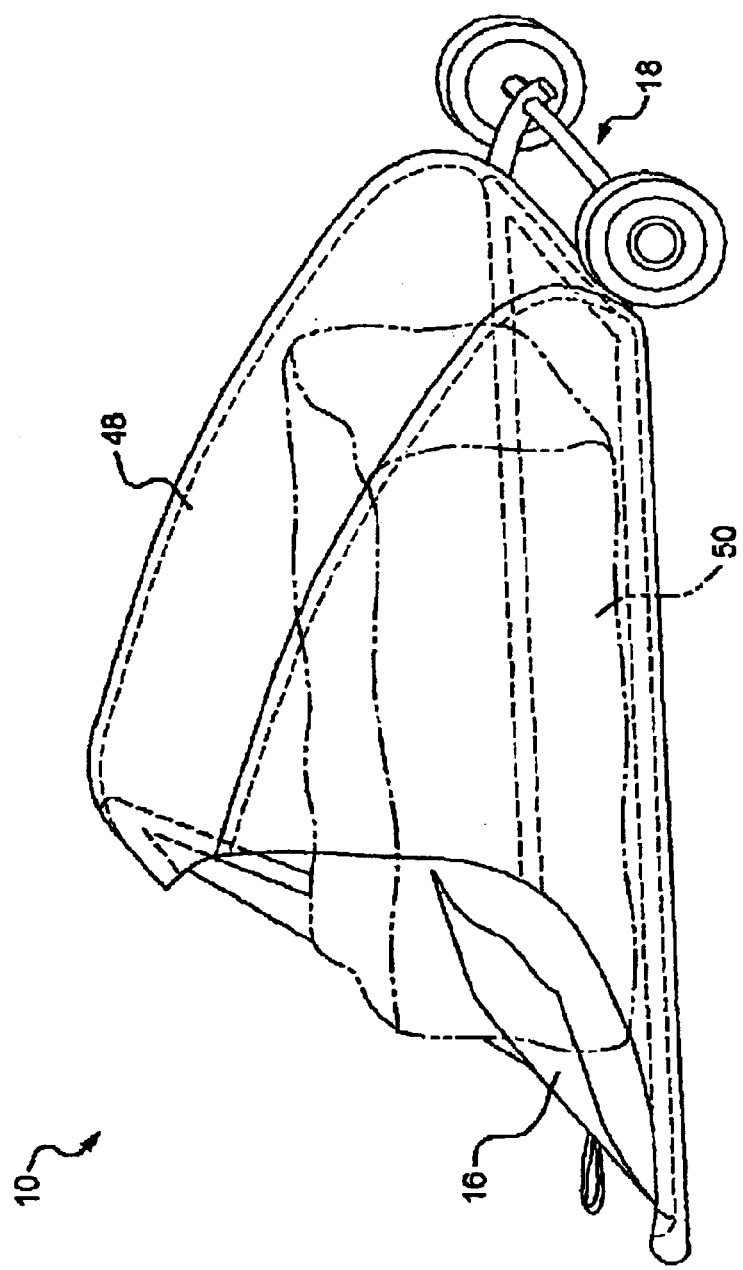
FIG. 5 is a side view of the preferred embodiment of the collapsible refuse collection apparatus with the covering and a collection bag within the body of the refuse collection apparatus; the flap is in the closed position.

Referring next to FIG. 5, a side view of the preferred embodiment of the apparatus 10 with the covering 48 and a collection bag 50 within the body of the apparatus 10 is shown. The flap 16 is in its closed position. In the preferred embodiment, the apparatus 10 is used in conjunction with paper disposable collection bags. However, the apparatus 10 can also accommodate disposable plastic collection bags, reusable collection bags, canvas collection bags, nylon collection bags, or other bags found and used in the art. The apparatus 10 can accommodate collection bags 10 in many sizes, ranging from 8×12×20 inches to 16×12×35, which is a typical 30 gallon sized bag. However, as shown in FIG. 1, the apparatus 10 can be used without a collection bag.

Figure 6:
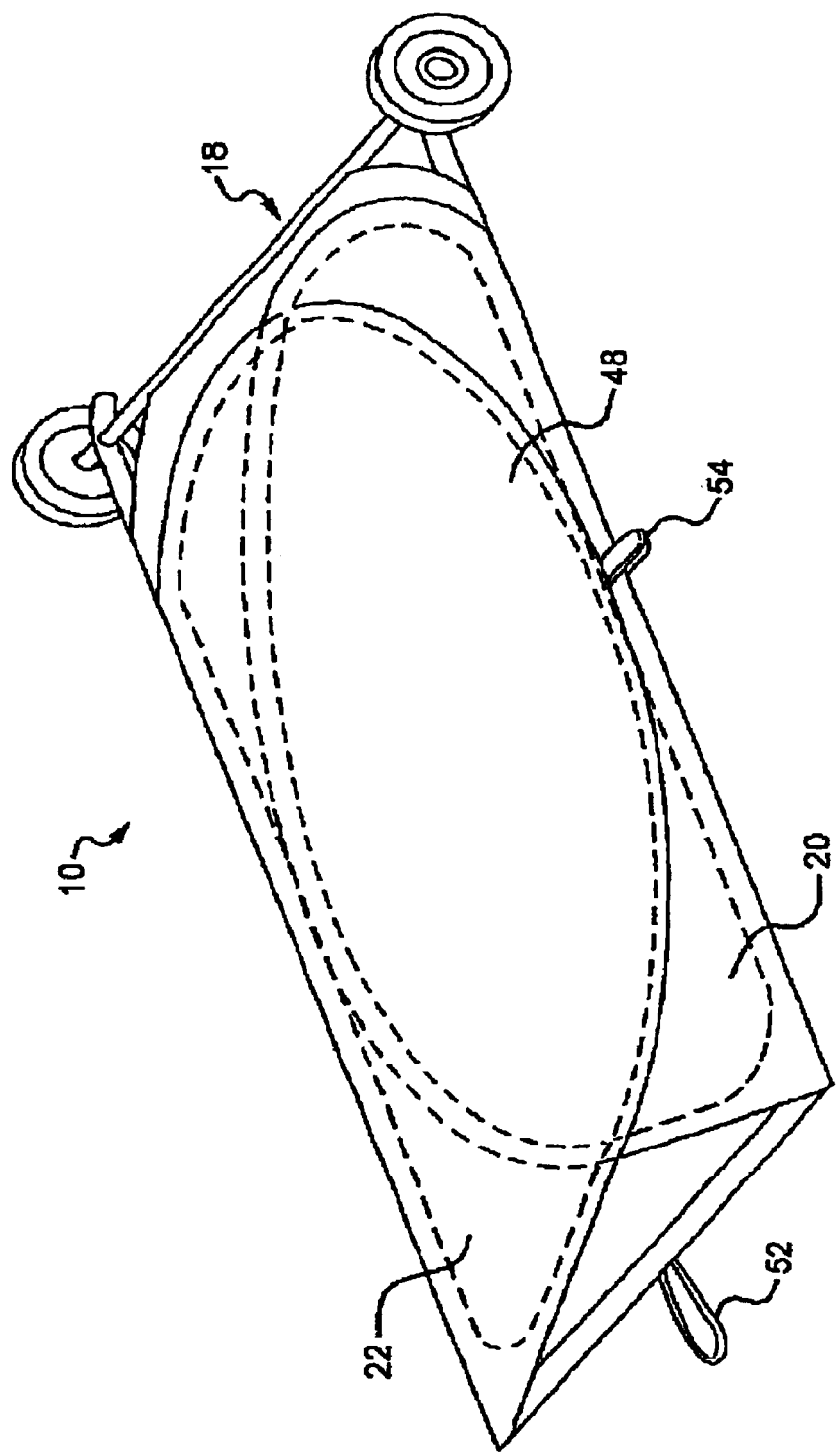
FIG. 6 is a front view of the preferred embodiment of the collapsible refuse collection apparatus with the covering, in the collapsed position.

Referring now to FIG. 6, a front view of the preferred embodiment of the apparatus 10 with the covering 48, in the collapsed position is shown. The apparatus 10 is easily collapsible, with the sides 20,22 folding towards each other and on top of the base 26. The top of the apparatus folds into itself because the top is made entirely from the covering 48, and not from the frame. The apparatus 10 is easily moved using the pull strap 52. The pull strap 52 can be used to carry the apparatus 10, or, alternatively, can be used to pull the apparatus using the wheel assembly 18. The apparatus 10 stays in the collapsed position, as shown in FIG. 6, because of the snap assembly 54. Additionally, when the apparatus 10 is in its non-collapsed position, the pull strap 52 is used to move the apparatus for collecting refuse.

Referring now to FIG. 7, a side view of the preferred embodiment of the apparatus 10, in the collapsed position, with exploded views of the pull strap 52 and the snap assembly 54 is shown. The pull strap 52 is preferably made from polyester 1" wide strap. However, in other embodiments, the pull strap 52 is made from leather, plastic, or any other material known and used in the art from pull straps. In the preferred embodiment, the pull strap 52 is a loop that is 1" wide. Pull strap 52 can be made using polyester, leather, plastic or canvas and the size can range anywhere from 1 to 2 inches wide.

Still referring to FIG. 7, the snap assembly 54 is shown in an exploded view. The snap assembly 54 includes a top 56 and a bottom 58. The top 56 includes the top part of the snap 60, which connected to a piece of fabric 62, made from polyester strap. The bottom 58 includes the bottom part of the snap 64, which is connected to a piece of fabric 66, made from polyester strap. In the preferred embodiment, the snap is of the type known and used in the art. In other embodiments, the snap is replaced by any other type of connection device known and used in the art including a loop and hook connection device.

The top 56 of the snap assembly 54 is connected to one side 22 of the apparatus 10, and the bottom 58 of the snap assembly 54 is connected to the other side 20, such that when the apparatus 10 is collapsed, as shown in FIG. 7, the top 56 of the snap assembly 54 is in mating position to attach to the bottom 58 of the snap assembly 54. In the preferred embodiment, the snap assembly 54 is located in roughly the center, length wise, of the sides 20,22.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A collapsible refuse collection apparatus having a refuse bag, comprising:

a body, said body having a frame portion and a covering portion having predetermined dimensions, said frame portion having an opened and closed position, two sides and a base; said two sides being adjacently and pivotally attached to said base, and a flexible bag support that pivotally hooks into said base to form an arch to hold said refuse bag opened, said covering portion being surroundedly attached to said frame portion, wherein said covering portion protects said frame portion and, in said frame portion's opened position, forms an inner compartment, a top, an opened end and a closed end;

a wheel assembly attached to said frame portion providing mobility for said apparatus;

an integral loading flap pivotally attached to said opened end of said covering portion and having predetermined dimensions wherein said flap assists in loading said apparatus with refuse; and said inner compartment, formed by said frame portion's opened position, having predetermined dimensions such that said inner compartment can accommodate a said refuse bag, said inner compartment and said refuse bag are used to collect said refuse;

whereby said sides pivot towards each other and fold towards said base, forming said frame portion's closed position.

2. The refuse collection apparatus claimed in claim 1, wherein said apparatus further comprising a bag support pivotally attached to said base, wherein said bag support has an up position and a down position, said up position provides support for said collection bag.

3. The refuse collection apparatus claimed in claim 1, wherein said apparatus further including a snap assembly having a top and a bottom part, said top part is attached to one of said two sides and said bottom part is attached to said other of said two sides, wherein said top part and said bottom part mate, forming a connection, when said frame portion is in said closed position.

4. The refuse collection apparatus claimed in claim 1, wherein said apparatus further comprising a pull strap attached to said covering.

5. The refuse collection apparatus claimed in claim 1, wherein said covering is water resistant poly coated nylon mesh.

6. The refuse collection apparatus claimed in claim 1, wherein said frame portion is tubular.

7. A collapsible refuse collection apparatus, comprising:

a body, said body having a frame portion and a covering portion having predetermined dimensions, said frame portion having an opened and closed position, two sides and a base; said two sides being adjacently and pivotally attached to said base, and a flexible bag support that pivotally hooks into said base to form an arch to hold said refuse bag opened, said covering portion being surroundedly attached to said frame portion, wherein said covering portion protects said frame portion and, in said frame portion's opened position, forms an inner compartment, a top, an opened end and a closed end;

a wheel assembly attached to said frame portion providing mobility for said apparatus;

a an integral loading flap pivotally attached to said opened end of said covering portion and having predetermined dimensions wherein said flap assists in loading said apparatus with refuse;

said inner compartment, formed by frame portion's opened position, having predetermined dimensions such that said inner compartment can accommodate said refuse bag, said inner compartment and said refuse bag are used to collect said refuse;

wherein said bag support has an up position and a down position, said up position provides support for said collection bag;

a pull strap attached to said covering; and a snap assembly having a top and a bottom part, said top part is attached to one of said two sides and said bottom part is attached to said other of said two sides, wherein said top part and said bottom part mate, forming a connection, when said frame portion is in said closed position;

whereby said sides pivot towards each other and fold towards said base, forming said frame portion's closed position.

8. The refuse collection apparatus claimed in claim 7, wherein said frame portion is tubular steel.

9. The refuse collection apparatus claimed in claim 8, wherein said covering is water resistant poly coated nylon mesh.

* * * * *